United States Patent [19]
Ho et al.

[11] Patent Number: 5,335,240
[45] Date of Patent: Aug. 2, 1994

[54] PERIODIC DIELECTRIC STRUCTURE FOR PRODUCTION OF PHOTONIC BAND GAP AND DEVICES INCORPORATING THE SAME

[75] Inventors: Kai-Ming Ho; Che-Ting Chan; Costas Soukoulis, all of Ames, Iowa

[73] Assignee: Iowa State University Research Foundation, Inc., Ames, Iowa

[21] Appl. No.: 995,248

[22] Filed: Dec. 22, 1992

[51] Int. Cl.$^5$ .............................................. H01S 3/14
[52] U.S. Cl. .................................................... 372/39
[58] Field of Search ..................... 372/39; 313/131 A; 378/119

[56] References Cited

U.S. PATENT DOCUMENTS

| | | |
|---|---|---|
| 4,453,805 | 6/1984 | Ashkin et al. |
| 4,607,368 | 8/1986 | Hori |
| 4,632,517 | 12/1986 | Asher |
| 4,737,960 | 4/1988 | Tsang |
| 5,172,267 | 12/1992 | Yablonovitch ............... 359/515 |
| 5,187,461 | 2/1993 | Brommer et al. ............. 333/219.1 |

FOREIGN PATENT DOCUMENTS

WO92/15124 9/1992 PCT Int'l Appl.

OTHER PUBLICATIONS

Photonic Band Structure: The Face-Centered-Cubic Case; Yablonovitch et al.; Oct. 30, 1989; vol. 63, No. 18, Physical Review Letters, pp. 1950–1953.

Photonic Band Structure-Yablonovitch; Analogies in Optics and Micro Electronics, 1990, pp. 117–133.

Photonic Bound States in Periodic Dielectric Materials; Robert D. Meade, et al.; vol. 44, No. 24; Dec. 15, 1991-II; pp. 13772–13774.

"Photonic Band-Gap Structures", Yablonovitch, 1993 Optical Society of America, vol. 10, No. 2, Feb. 1993, pp. 283–295.

"Suppression of Molecular Interactions in Periodic Dielectric Structures", Kurizki et al., Physical Review Letters, vol. 61, No. 19, Nov. 7, 1988, pp. 2269–2271.

"Inhibited Spontaneous Emission in Solid-State Physics and Electronics", Yablonovitch Physical Review Letters, vol. 58, No. 20, May 18, 1987, pp. 2059–2062.

"Existence of a Photonic Gap in Periodic Dielectric Structures," Ho et al., Physical Review Letters, vol. 65, No. 25, Dec. 17, 1990, pp. 3152–3155.

"Existence of a Photonic Band Gap in Two Dimensions", Meade et al., Appl. Phys. Lett., vol. 61, No. 4, Jul. 27, 1992, pp. 495–497.

"Two-Dimensional Photonic Band Structures", Plihal et al., Optics Communications, vol. 80, No. 3.4, Jan. 1, 1991, pp. 199–204.

(List continued on next page.)

*Primary Examiner*—Rodney B. Bovernick
*Assistant Examiner*—Robert E. Wise
*Attorney, Agent, or Firm*—Leydig, Voit & Mayer Ltd.

[57] ABSTRACT

A periodic dielectric structure which is capable of producing a photonic band gap and which is capable of practical construction. The periodic structure is formed of a plurality of layers, each layer being formed of a plurality of rods separated by a given spacing. The material of the rods contrasts with the material between the rods to have a refractive index contrast of at least two. The rods in each layer are arranged with their axes parallel and at a given spacing. Adjacent layers are rotated by 90°, such that the axes of the rods in any given layer are perpendicular to the axes in its neighbor. Alternating layers (that is, successive layers of rods having their axes parallel such as the first and third layers) are offset such that the rods of one are about at the midpoint between the rods of the other. A four-layer periocity is thus produced, and successive layers are stacked to form a three-dimensional structure which exhibits a photonic band gap. By virtue of forming the device in layers of elongate members, it is found that the device is susceptible of practical construction.

14 Claims, 12 Drawing Sheets

U.S. PATENT DOCUMENTS

"Photonic Band Structure: The Face-Centered-Cubic Case Employing Nonspherical Atoms", Yablonovitch et al., Physical Review Letters, vol. 67, No. 17, Oct. 21, 1991, pp. 2295–2298.

"Donor and Acceptor Modes in Photonic Band Structure", Yablonovitch et al., Physical Review Letters, vol. 67, No. 24, Dec. 9, 1991, pp. 3380–3383.

"Measurement of Photonic Band Structure in a Two-Dimensional Periodic Dielectric Array", Robertson et al., Physical Review Letters, vol. 68, No. 13, Mar. 30, 1992, pp. 2023–2026.

"Radiation Properties of a Planar Antenna on a Photonic-Crystal Substrate", Brown et al., Optical Society of America, vol. 10, No. 2, Feb. 1993, pp. 404–407.

"Enhancement and Inhibition of Radiation in Cylindrically Symmetric, Periodic Structures", Erdogan et al., Optical Society of America, vol. 10, No. 2, Feb. 1993, pp. 391–398.

PERIODIC DIELECTRIC STRUCTURE FOR PRODUCTION OF PHOTONIC BAND GAP AND DEVICES INCORPORATING THE SAME

FIELD OF THE INVENTION

This invention relates to periodic structures of dielectric material, and more particularly to such structures which produce a photonic band gap.

BACKGROUND OF THE INVENTION

A number of studies have been done regarding propagation of electromagnetic (EM) waves in periodic dielectric structures. It has been suggested that photons in such media can be described by a photonic band theory analogous to electronic band theory in crystals because of the wave nature of photons. One result of a photonic band theory is the possibility of the existence of photonic band gaps in periodic dielectric structures. The presence of a photonic band gap around a particular frequency would mean that propagation of EM waves would be forbidden for all wave vectors (i.e., in every direction) at frequencies within the gap. Spontaneous emission at those frequencies would be inhibited since the photons that would otherwise result cannot propagate. If the frequency of the radiative recombinations of electron-hole pairs in a semiconductor device fell within that photonic band gap, those recombinations would be forbidden. As a result, more carriers would be available in a diode laser for stimulated emission at the lasing frequency, and the efficiency of the laser would be improved. A similar improvement in operating efficiency would also be found in other quantum electronic devices that are limited in efficiency by radiative recombination.

At least one experimenter has reported the existence of a photonic band gap in a structure where dielectric material was arranged in a face-centered-cubic (fcc) lattice structure. That structure had spherical cavities at the lattice sites with another dielectric filling the gaps between the spheres. The filling ratio of the spheres was 86%, that is, slightly more than overlapped. The ratio of the dielectric constant of the filling dielectric to that of air in the spherical cavities was 3.5. The reported band gap only occurred in this particular structure, despite the fact that a wide variety of filling fractions and dielectric ratios were tried. It is now believed, however, that the results of that experiment were in error, and that a photonic band gap does indeed not exist in the lowest bands for dielectric spheres arranged in the fcc structure.

The present inventors have pointed out the error of that experiment and have proposed a diamond lattice crystal structure capable of achieving a true photonic band gap in a paper entitled "Existence Of A Photonic Gap In Periodic Dielectric Structures", by K. M. Ho et al., *Physical Review Letters*, Vol. 65, No. 25, pp. 3152-3155 (Dec. 17, 1990). The structures proposed in that paper have been further developed in a paper entitled "Photonic Band Gaps In Experimentally Realizable Periodic Dielectric Structures", by C. T. Chan et al., Europhysics Letters, 16(6), pp. 563-568 (Oct. 7, 1991).

In all cases, however, the periodic dielectric structures which have been proposed are difficult to build in the micron or submicron length scales. For example, with respect to the diamond structure discussed in these papers, the structure could be composed of dielectric spheres suspended in another material (such as air), but the suspension of the spheres in the diamond crystal structure would be difficult. As an alternative, semispherical holes could be drilled in dielectric slabs, and the slabs arranged to locate the holes in the required diamond structure. In that case, six holes would be required in each slab (for each crystal), and three of the holes would be relatively easy to drill, but the other three quite difficult. In addition, it is difficult when drilling holes in the micron and submicron length scales, particularly very elongated holes, to maintain the diameters exactly the same, and the crystal structure would suffer as a result.

The more recent of the two papers proposes linking of lattice sites in the crystal by means of elongated rod, and while that is a constructional improvement over the previous proposals, it is still a structure which is not readily buildable.

Thus, while theory has proposed a number of dielectric structures capable of producing photonic band gaps, the actual experiments which have resulted from the papers have utilized crystal structures which are difficult to build with precision, because of the difficulty of positioning the dielectric materials in the desired orientations with respect to each other.

SUMMARY OF THE INVENTION

Accordingly, it is a general aim of the present invention to provide a periodic dielectric structure capable of producing a photonic band gap and which is readily buildable in a practical sense.

In achieving that aim, it is an object of the present invention to produce a layered structure, in which elements of the periodic structure can be arranged with respect to each other in layers, with the layers stacked one on the other to produce a three-dimensional periodic structure capable of achieving a true photonic band gap.

In that respect, it is an object to use elements to form the respective layers which can be readily and easily fabricated, such as cylinders or rods which are primarily one-dimensional in nature, and which can be arranged with respect to each other in a layer and fixed in that layer, with additional layers stacked one on the other to form the three-dimensional structure.

Thus, it is an object to produce a periodic dielectric structure comprised of elongate rods or cylinders arranged in layers, with the layers stacked one on the other, and the respective dimensions of the rods, layers and interspersed material being such as to produce a photonic band gap at a desired frequency.

A further object of the invention is to provide a three-dimensional structure capable of achieving a photonic band gap in which the mechanical configuration of the structure is readily tunable to achieve a desired mid-gap frequency and gap width.

It is a feature of the present invention that the photonic band gaps can be achieved in a periodic dielectric structure with a variety of filling ratios.

It is a further feature of the invention that photonic band gaps can be achieved in the periodic dielectric structure comprised of material which has a variety of indices of refraction among the constituent dielectrics.

In accordance with the invention, there is provided a periodic dielectric structure which exhibits a photonic band gap. A plurality of dielectric rods are arranged in layers, and the layers stacked to provide a matrix. The rods are interspersed with a material of a contrasting dielectric index. Each of the layers which form the three-dimensional structure has a plurality of rods arranged in parallel and at a given spacing. The axes of the rods in adjacent layers are rotated at 90° with respect to the neighbor layer. In alternating layers (i.e., successive layers having their axes in the same direction), the rods in one layer are offset with respect to the other by about half the inter rod spacing. Thus, a four-layer periodicity is produced. The dimensions of the rods, the spacing between the rods (laterally and vertically), and the dielectric constants of the materials are selected to produce a photonic band gap at a given wavelength.

Other objects and advantages will become apparent from the following detailed description when taken in conjunction with the drawings, in which:

DETAILED DESCRIPTION OF THE PREFERRED EMBODIMENTS

While the invention will be described in connection with certain preferred embodiments, there is no intent to limit it to those embodiments. On the contrary, the intent is to cover all alternatives, modifications and equivalents included within the spirit and scope of the invention as defined by the appended claims.

Figure 1:
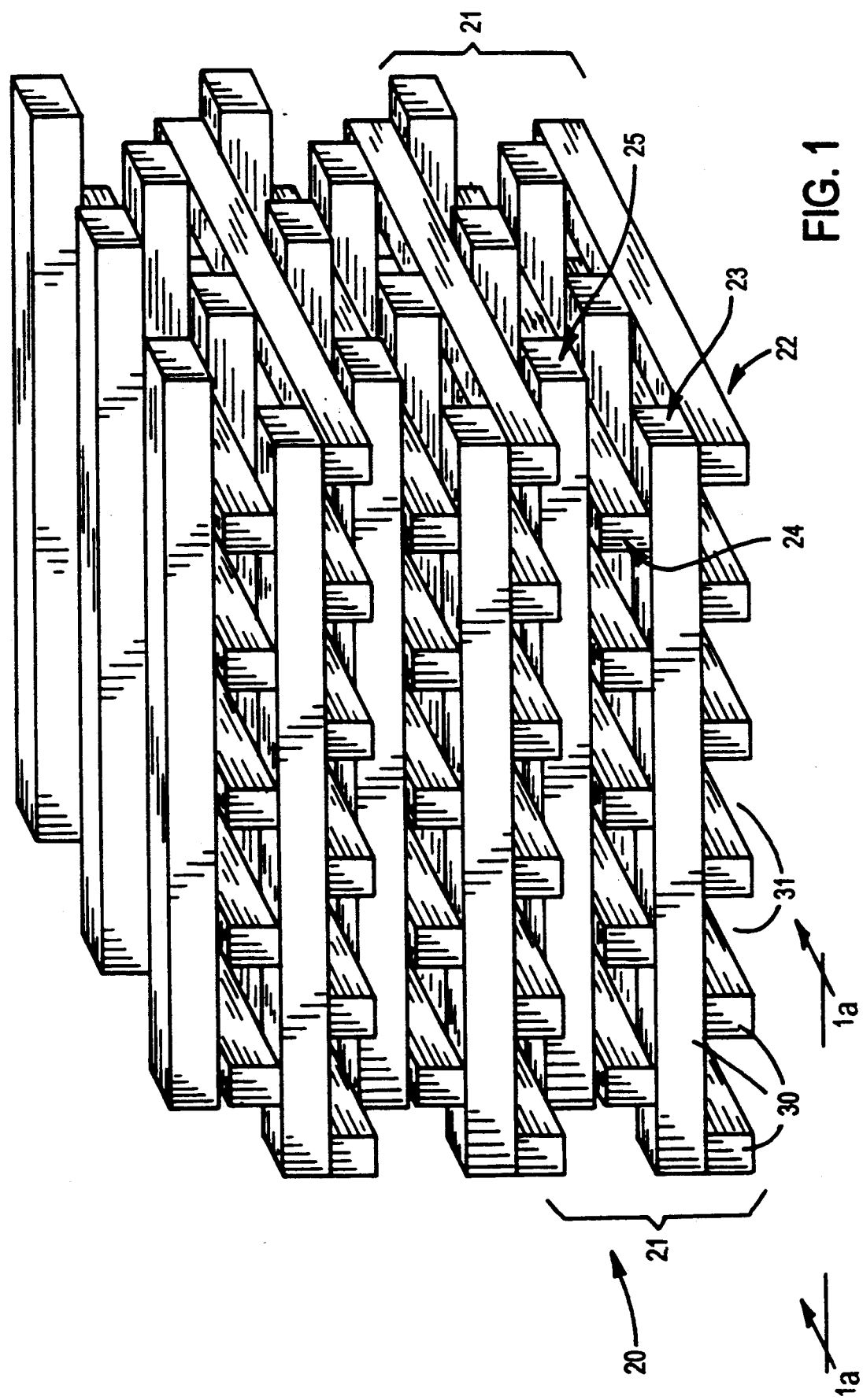
FIG. 1 is a perspective view of a dielectric structure exemplifying the present invention.

Turning now to the drawings, FIG. 1 shows a periodic dielectric structure 20 exemplifying the present invention. A group of four layers of the structure is bracketed at 21 and comprises separate layers 22, 23, 24, 25 stacked, one on the other in a configuration to be described below. Each of the layers is comprised of a plurality of rods 30 interspersed by segments 31 of a material having a contrasting dielectric constant. In the FIG. 1 embodiment, the rods 30 are dielectric material and are interspersed with material of a contrasting dielectric constant, such as air or water. In a modified embodiment, both the materials 30 and 31 can be solid, such as dielectric material within an insulating foam.

The rods 30 which comprise the dielectric structure 20 of FIG. 1 are rectangular in cross section and are preferably all of the same cross sectional shape and size. The rods 30 are straight elongate members having axes which are arranged parallel with respect to each other to form a given layer, such as layer 22. The center-to-center spacing between the rods is defined as "a" (see FIG. 1a). Adjacent layers of rods have their axes oriented at right angles with respect to the neighboring layer, and thus the layer 23, which has rods 30 of the same cross section as layer 22, and the axes of its rods oriented at right angles to the axes of the rods comprising layer 22. The next successive layer, such as layer 24, thereby has its axes parallel to the axis of the rods forming layer 22, and at the same center-to-center spacing "a". The terms "alternate layer" or "alternating layers" are sometimes used herein to refer to these layers which have their axes parallel to each other and are separated by a single layer with axes rotated by 90°. Thus, in the third layer, such as layer 24, the rods are offset with respect to the layer 22, such that the rods are displaced by about half the inter rod spacing. It will be seen in FIG. 1a that rod 30a is dimensioned to be at a distance a/2 with respect to the position of the rod 30b within the layer 22. Finally, the layer 25 has the axes of its rods oriented parallel to the axes of the rods 23, and the individual rods thereof displaced about centrally between the rods 23.

It will be appreciated that the structure of FIG. 1 is relatively easy to build as compared to the structures proposed in the prior art. For example, an individual layer, such as layer 22, can be formed using a guide or template (or computer controlled formation devices), to achieve the rod configuration and spacing desired for that particular application. The layer 23 can be separately formed or formed directly on the layer 22 after the layer 22 is in place. It may be preferable, for example, to form each of the layers 22, 23, 24, 25, etc. individually, then lay the layers up one on the other. In other cases, it may be preferable to build the structure starting with the lower layer and laying additional layers on top as the structure is completed. In any event, it will be appreciated that there is a relatively easy-to-construct structure having layers, such as layer 22, formed of materials 30 and 31 of substantial dielectric contrast and at a given spacing and configuration, with subsequent layers oriented at right angles with respect to each other, and alternating layers of the same orientation disposed with the rods of one spaced between the rods of the other, so as to form a sub-structure 21 of four-layer periodicity. The structures 21 are layered one on top of the other to form a larger three-dimensional structure which will be found to exhibit a photonic band gap.

Referring again to FIG. 1a, parameters of the periodic structure will be pointed out, and will later be related to each other as they affect the ability of the structure to tune the wavelength of the forbidden gap. It will be seen that a four-layer composite is defined by the dimension "c", and the relationship between the depth (in the z dimension) and its relationship to the spacing between adjacent rods "a" will be discussed below. The aspect ratio of the rods will also be discussed. The aspect ratio is defined as the ratio between the height z of any given rod and its width x. Thus, for a rod which is shorter than it is wide (in the orientation shown in FIG. 1a), the aspect ratio will be less than unity, and for a rod which is taller than it is wide, the aspect ratio will be greater than unity. The filling ratio is the ratio of the material of the rods to the material of the matrix which surrounds the rods. Taking the example of FIG. 1, the filling ratio will be the ratio of the volume of the rods 30 as compared to the volume of air (or other material 31) interposed between the rods. Similarly, when the rods are holes (low dielectric constant) in a high dielectric block, the filling ratio is the ratio of the volume of the holes (the rods) to the volume of the high dielectric matrix.

Figure 1A:
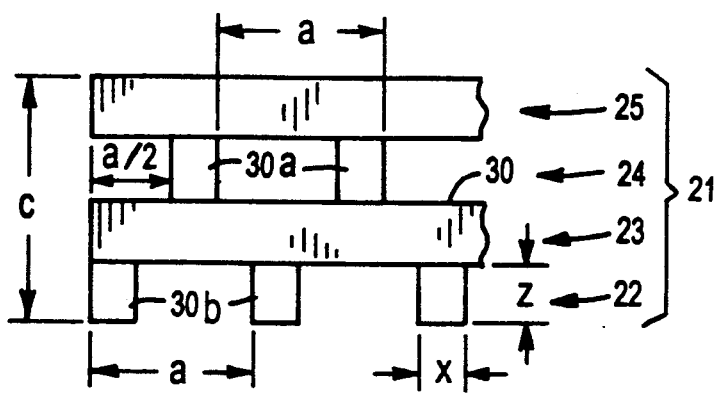
FIG. 1a is a partial view taken along the line 1a—1a of FIG. 1, showing certain geometric relationships for the periodic structure.

While FIGS. 1 and 1a show a relatively simple structure in which the layers touch but do not overlap, it is sometimes desirable to have overlapping layers. For example, as will be pointed out below, it is possible to form a dielectric structure according to the invention by drilling holes in a block of dielectric materials, with the rods being the holes in the material. In that structure it is relatively easy for the layers to overlap since the periphery of one hole can project into a layer defined by the periphery of another hole. Using solid rods, it is also possible to overlap the layers by appropriately notching the rods. It is also possible to interpose gaps of low dielectric constant material between layers. Performance-wise, that is not desirable, but when it is of constructional benefit, a relatively small space can be accommodated.

As noted above, the materials which comprise the rods and the interstices should be of different dielectric constants or refractive indices. It will be appreciated that the dielectric constant is the square of the refractive index, and the terms are used somewhat interchangeably herein, except that where a numerical contrast is specified, the refractive index is always used. Examples of a choice of high refractive index (or high dielectric constant) material are alumina, silicon, GaAs, indium phosphide, titanium dioxide and diamond. Examples of the low refractive index material (or low dielectric constant material) are air, water and silicon dioxide. The ratio of the height of a group of layers (c) to the repeat distance (a) along a layer can be varied to optimize the band gap. Also, the aspect ratio has an impact on the band gap as does the fill ratio. The cross sectional shape of the rods can also be varied, and can comprise rectangular rods as illustrated in FIG. 1 (and the special case of square rods), as well as rods of elliptical or circular cross section. Other shapes may also be useful. For example, when forming the rods by etching it may be difficult to form perfect rectangles, and the multi-sided shape or trapezoid which may result will also operate according to the invention. The stacked layers can be touching or they can overlap, or as noted above, they can be slightly separated.

With proper choice of refractive index contrasts and fill ratios, as will be pointed out below, the above structures will exhibit photonic band gaps (that is, frequency regions in which no propagating electromagnetic wave modes can exist. These photonic band gap materials can be used in various applications which require the suppression of spontaneous emission of light inside the photonic gap. For example, they can be used in laser diodes to enhance efficiency.

Figure 2:
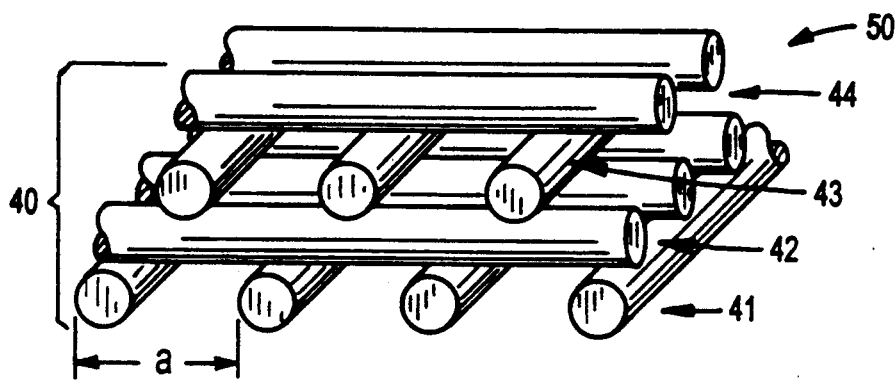
FIG. 2 is a diagrammatic structure, intended to be similar to FIG. 1, but showing the use of circular rather than rectangular rods.

Turning to FIG. 2, there is illustrated a portion of a dielectric structure, like the structure of FIG. 1, but utilizing circular rods. A series of four layers 41–44 are illustrated to comprise a four-layer periodic structure 40 comprised of a plurality of rods 46 of circular cross section. The center-to-center distance "a" between the rods is utilized in the following expressions in the same fashion as the spacing in the rectangular case of FIG. 1. Similarly, the height and the z direction of a four-layer periodic structure is defined as "c", and the aspect ratio is defined in the same way as in the prior example.

Figure 3:
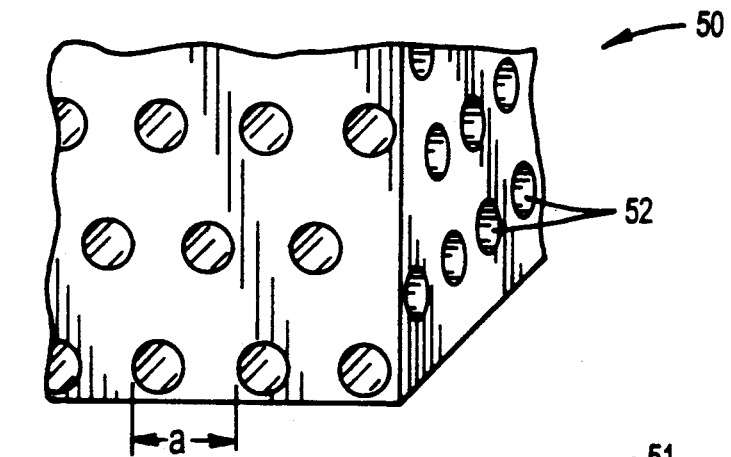
FIG. 3 is a diagrammatic view showing the inverse of the system of FIG. 2 in which the cylinders are cylindrical holes formed in a dielectric material.
Figure 4:
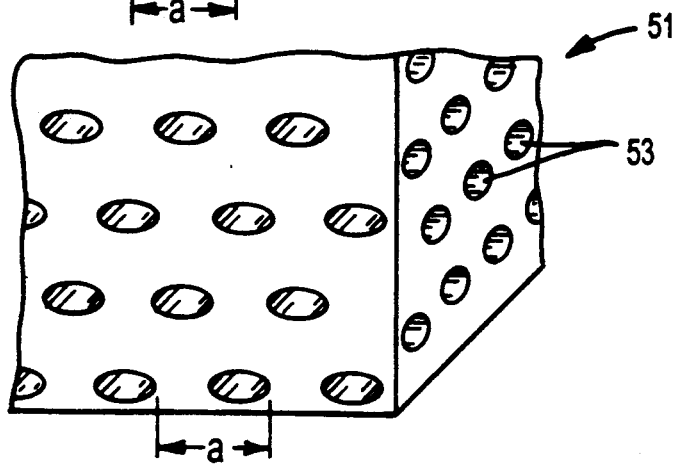
FIG. 4 is a diagram similar to FIG. 3 but showing the use of elliptical cylinders.

FIGS. 3 and 4 illustrate the converse structure where holes are formed in a block 50 or 51 of dielectric material. In the FIG. 3 embodiment, the holes 52 are circular, whereas in the FIG. 4 embodiment, the holes 53 are elliptical. The holes can be filled with air or other low dielectric index material. In both cases, the center-to-center spacing "a" is arranged as in the other embodiments. But in this case, the rod is of low dielectric material and the interstices of high dielectric material. The axes of the rods are parallel to each other, and in adjacent layers, the orientation is changed by 90° such that adjacent layers have mutually perpendicular axes. With respect to any two alternate layers (successive layers whose axes are in the same direction), the rods of one layer are arranged at the mid-point between the rods of the other layer, to produce a structure of four-layer periocity when the layers are stacked one on the other. It will be seen by a comparison of FIG. 3 and FIG. 4 that the same conditions apply to the elliptical embodiment. In the case of FIG. 4, the ellipses can be arranged with an aspect ratio greater than unity as illustrated, or the ellipses can be rotated 90° to produce an aspect ratio which is less than unity.

We have developed a calculation method which can be used to determine the band structure of periodic materials, and thus the presence of the photonic band gap. The calculation method takes into account the vector nature of the electromagnetic field present within the structure. While it is of general applicability, we have used it for the layered structures constructed in accordance with the present invention and have determined the presence, absence and quality of a band gap produced by such structures. We have furthermore determined the effect on the gap (or on the gap/mid-gap ratio) of different parameters of the structure, such as filling ratio, aspect ratio, c/a ratio, rod shape, refractive index contrast, and the like.

We will first present the calculation method (and a portion of its derivation) and will thereafter illustrate the manner in which the periodic structures according to the present invention will provide the gap/mid-gap ratio. In such a periodic structure, the dielectric constant is position dependent, which allows Maxwell's equations to be written as:

$$\nabla \times E = i\left(\frac{\omega}{c}\right)H, \nabla \times H = -i\left(\frac{\omega}{c}\right)\epsilon(r)E, \quad (1)$$

which can be further simplified to:

$$\nabla \times \left(\frac{1}{\epsilon(r)} \nabla \times H\right) = \frac{\omega^2}{c^2} H. \quad (2)$$

The periodic dielectric function can then be expanded using Bloch's theorem to expand the $\vec{H}$ field in plane waves, $$H(r) = \sum_G \sum_{\lambda=1}^{2} h_{G,\lambda} e_\lambda e^{i(k+G)\cdot r}, \quad (3)$$

substitution of equation 3 into the simplified Maxwell equation 2 results in the matrix equations:

$$\sum_{G',\lambda'} H \xrightarrow[G,G']{\lambda,\lambda'} h_{G,\lambda'} = \frac{\omega^2}{c^2} h_{G,\lambda'} \quad (4)$$

where:

$$H_{G,G'} = |k+G||k+G'|\epsilon \xrightarrow[G,G']{-1} \begin{pmatrix} e_2 \cdot e_{2'}, & -e_2 \cdot e_{1'} \\ -e_1 \cdot e_{2'}, & e_1 \cdot e_{1'} \end{pmatrix}$$

It should be noted that the periodic dielectric structure $\epsilon(\vec{r})$ only enters in the calculation through the position-dependent dielectric function which was evaluated on a fine grid in the real space unit cell and Fourier transformed into reciprocal space. This allows use of this calculation to calculate the photonic bands for any periodic arrangement of objects, including allowing them to have arbitrary shapes, filling ratios, and various index of refraction contrasts. The index of refraction contrasts refers to the ratio of the indices between the material filling the gaps between the dielectric spheres, and that of the dielectric spheres themselves.

Figure 5:
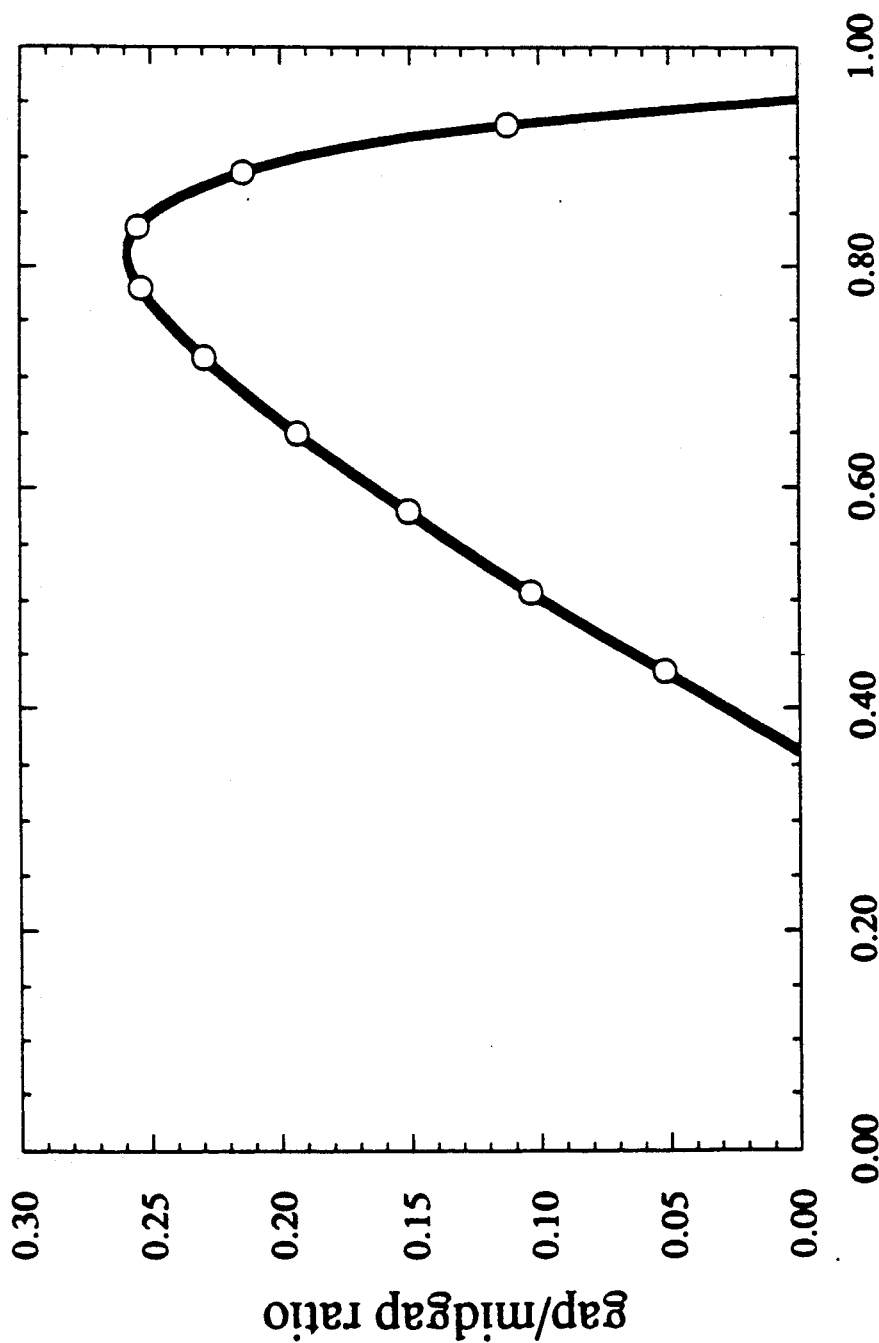
FIG. 5 is a graphical representation showing the dependence of the gap/mid-gap frequency ratio on the filling ratio for cylindrical holes in a dielectric material.

Utilizing the foregoing relationships, we have determined optimum characteristics for structures in accordance with the present invention, and those will be described in connection with FIGS. 5 through 11. FIG. 5 relates to periodic dielectric structure such as that shown in FIG. 3 which has cylindrical holes formed in a dielectric block. The refractive index contrast, that is, the ratio between the indices of the high and low index material, is taken to be 3.6 for the example of FIG. 5. It will be appreciated that a minimum refractive index contrast of about 2.0 is necessary to produce a photonic band gap in such structures. In the structure of FIG. 5, the individual rods can overlap one another, that is, the cylindrical holes in one layer can project into the succeeding layers. The ratio of the repeat distance in the z direction (identified as "c" in FIG. 1) to the repeat distance in the x and y direction "a", is taken to be 1.414 for the structure of FIG. 5. The figure illustrates the photonic band gap (normalized to the frequency at the center of the gap), in other words, the gap/mid-gap frequency ratio as a function of filling ratio. It will be seen that the maximum gap/mid-gap ratio of about 0.26 is achieved for a filling ratio of about 0.81. The wavelength of the forbidden light is proportional to and of the same magnitude as the repeat distance of the structure. Thus, the dimensions of the rods themselves can be selected to meet this criteria, with the spacing and dielectric constants selected to meet the desired gap/mid-gap ratio.

Figure 6:
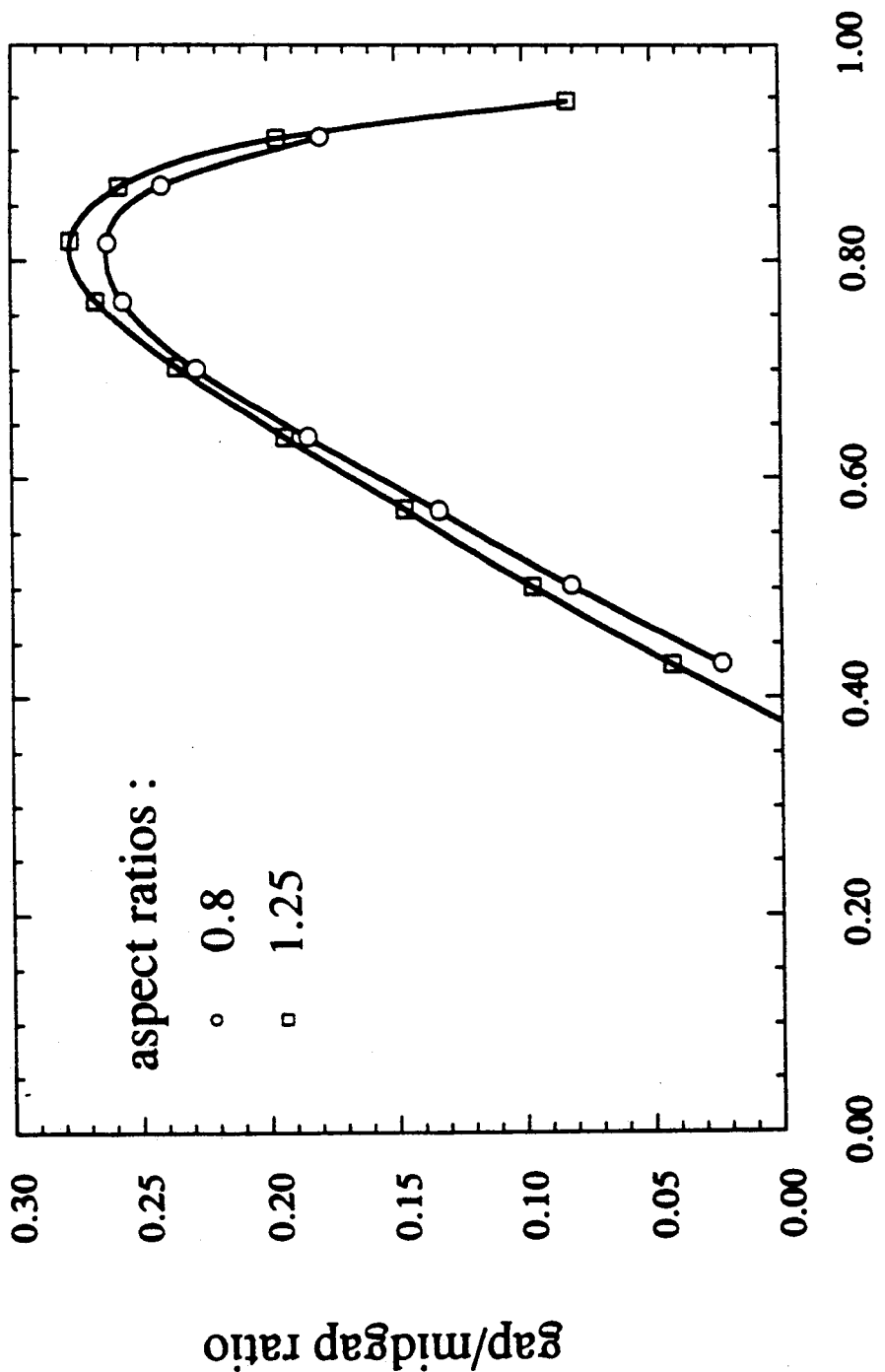
FIG. 6 is a graphic representation showing the dependence of the gap/mid-gap frequency ratio on the filling ratio for cylindrical holes of elliptical cross section in a dielectric material.

FIG. 6 illustrates the case with cylindrical holes of elliptical cross section. As in the FIG. 5 embodiment, the refractive index contrast is selected to be 3.6 and the c/a ratio is 1.414. FIG. 6 illustrates ellipses with the major axis vertical (that is, an aspect ratio which is greater than 1), and also with the major axis horizontal (that is, with an aspect ratio of less than unity). It will be seen that the structure using elliptical cross section rods operates very much like the special case of circular cross sectional rods (FIG. 5) in achieving a maximum gap/mid-gap ratio at about a filling ratio of 0.81. It will also be seen, however, particularly for aspect ratios greater than unity, that a slightly higher gap/mid-gap ratio of about 0.27 can be achieved.

Figure 7:
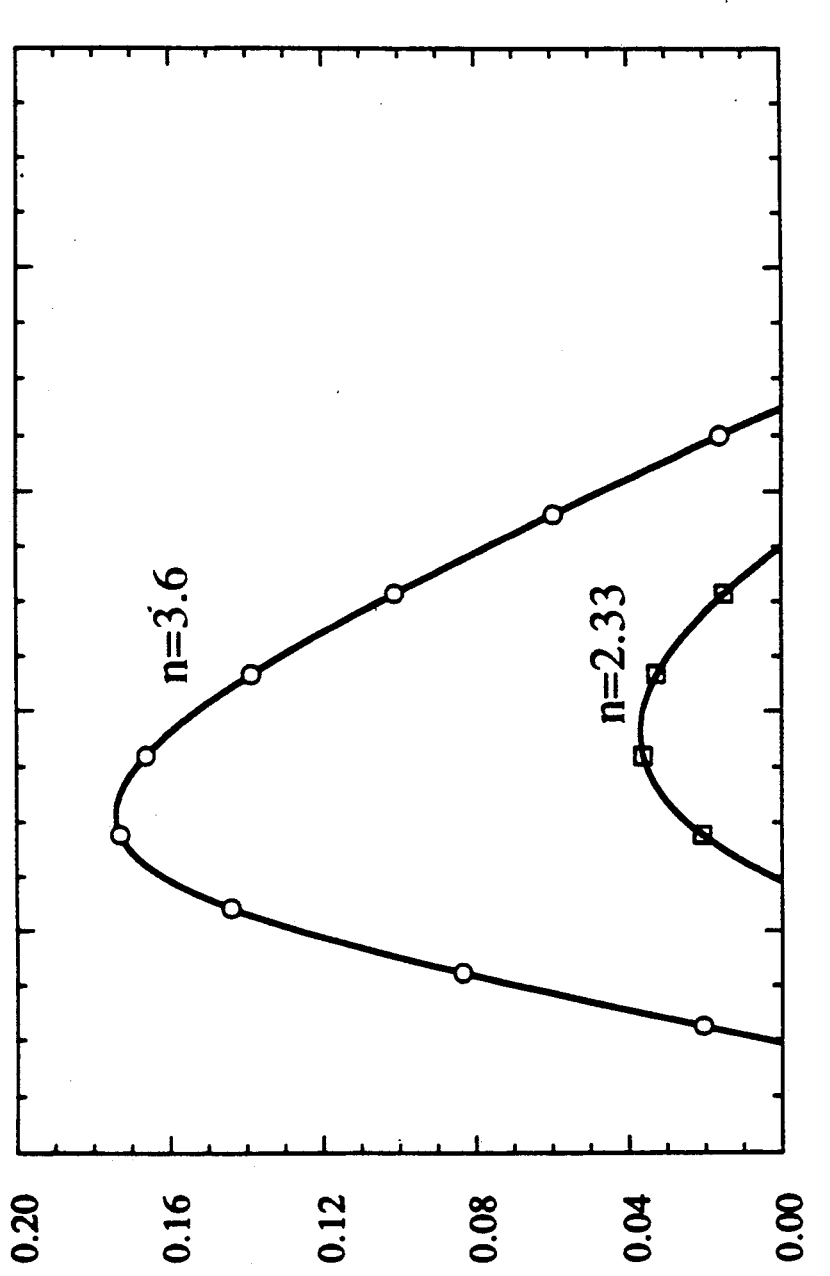
FIG. 7 is a graphical representation showing the dependence of the gap/mid-gap frequency ratio on the filling ratio for a structure comprised of stacked layers of dielectric cylinders.

FIG. 7 illustrates the case such as shown in FIG. 2 for dielectric cylinders separated by material of lower dielectric constant. The c/a ratio for the structure of FIG. 7 is also taken to be 1.414, and the diagram of FIG. 7 illustrates two cases for a refractive index contrast of 3.6 and a refractive index contrast of 2.33. For the former, it will be seen that the optimum filling ratio is about 0.25 and achieves a maximum gap/mid-gap ratio of about 0.175. For the lower contrast material, the optimum filling ratio is about 0.38, but a gap/mid-gap ratio of only 0.04 is achievable in that configuration. As in the case of FIG. 5, the structures of FIGS. 6 and 7 contemplate the condition where the rods can overlap one another. That is also the case for FIG. 8, which illustrates dielectric cylinders of rectangular cross section with an aspect ratio of 0.6. For the high dielectric contrast material (contrast of 3.6), the optimum filling ratio is about 0.21 and that can achieve a gap/mid-gap ratio of about 0.175. At lower contrast ratios, the optimum filling ratio increases, but the gap/mid-gap ratio substantially decreases. For example, at a contrast ratio of 2.33, the optimum filling ratio is about 0.3, but the gap/mid-gap ratio is only about 0.02.

We have found that the rectangular cross sectional configuration can be optimized when the separation of the rods (i.e., the dimension "a"), is about 0.7 units of length, and the height of each rod is about 0.25 units, such that the dimension "c", is one unit. The wavelength in that structure of the forbidden light is proportional to and of the same magnitude as the repeat distance of the structure. The optimum filling ratio for that structure is around 28%. For a refractive index contrast of about 3.6, the optimum gap to mid-gap ratio is around 18%. Particularly using rectangular rods, the advantage of the structure is such that it can be fabricated in a layer-by-layer fashion with relative ease. Imperfect cross sections are expected to perform in substantially the same way.

Figure 8:
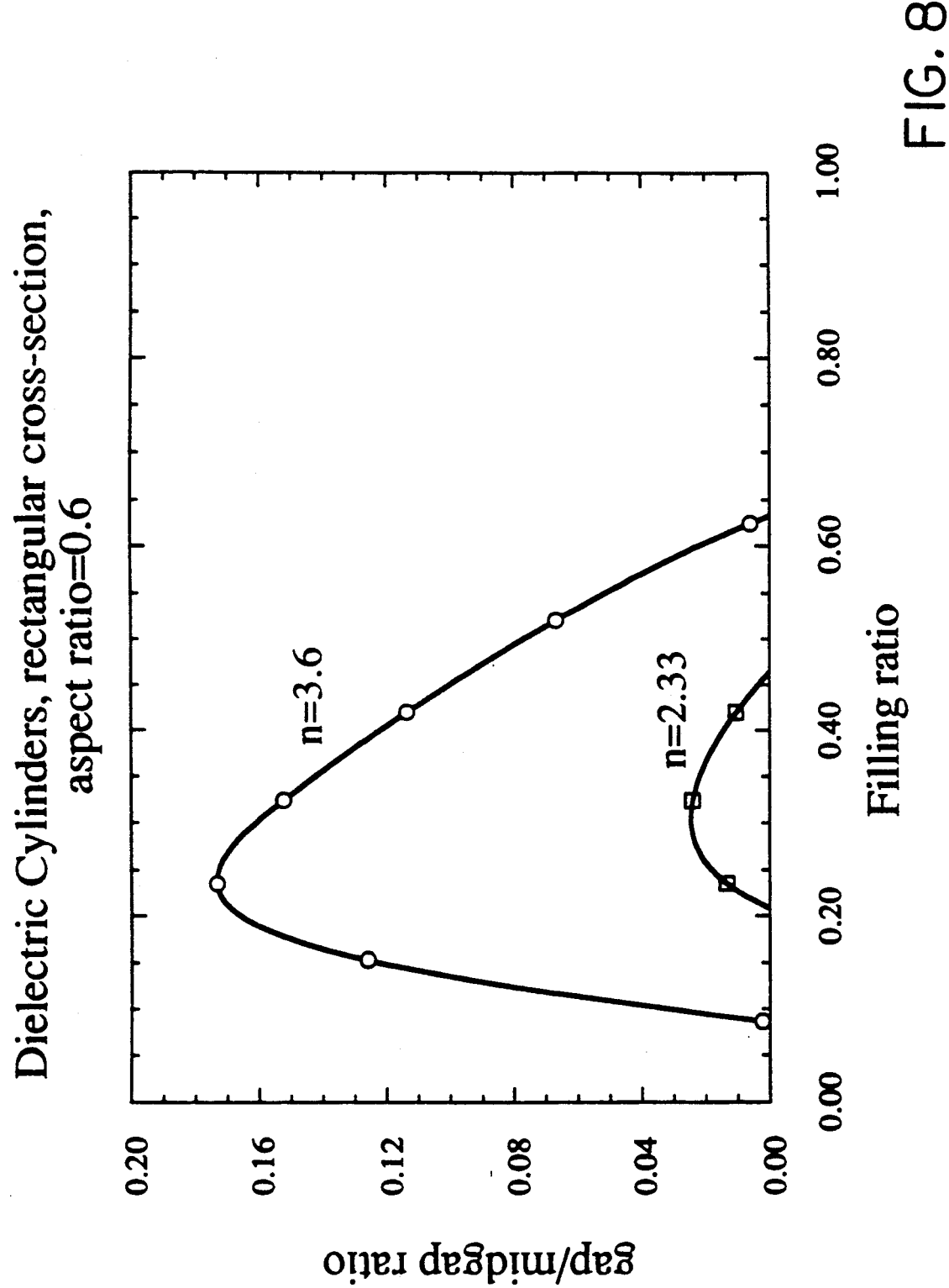
FIGS. 8 and 9 are graphical representations showing the dependence of the gap/mid-gap frequency ratio on the filling ratio for a structure comprising dielectric cylinders of rectangular cross section arranged in stacked layers.
Figure 9:
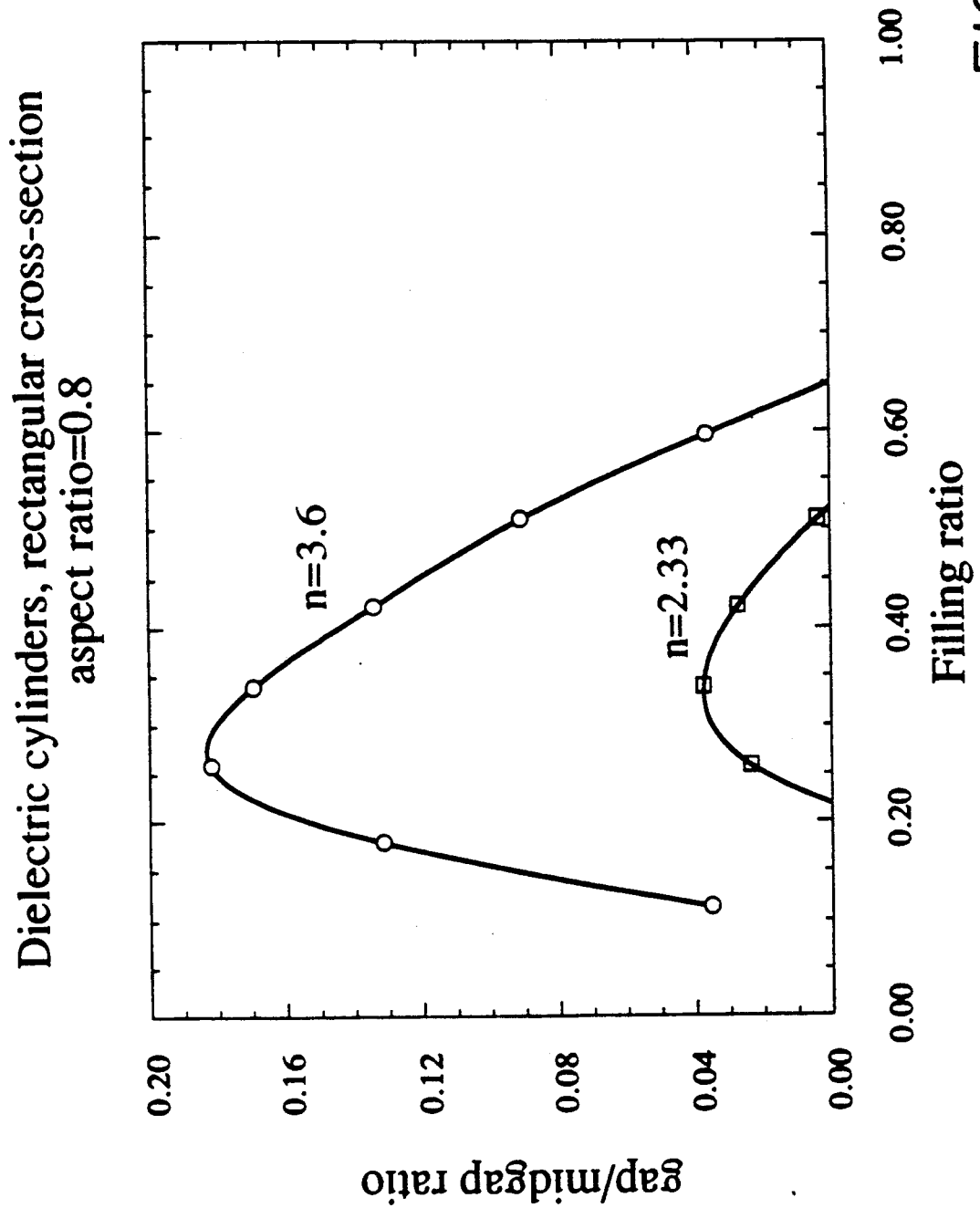

FIG. 9 shows a structure similar to that considered in connection with FIG. 8—that is, dielectric rods of rectangular cross section. The structure illustrated in FIG. 9 differs from that of FIG. 8 in that the aspect ratio is taken to be 0.8 instead of 0.6. The shapes of the curves are substantially the same, but it will be seen that the maximum gap to mid-gap ratio is slightly better than the structure of FIG. 8, approaching 0.19 at a filling ratio of about 0.3 for a refractive index contrast of 3.6.

Figure 10:
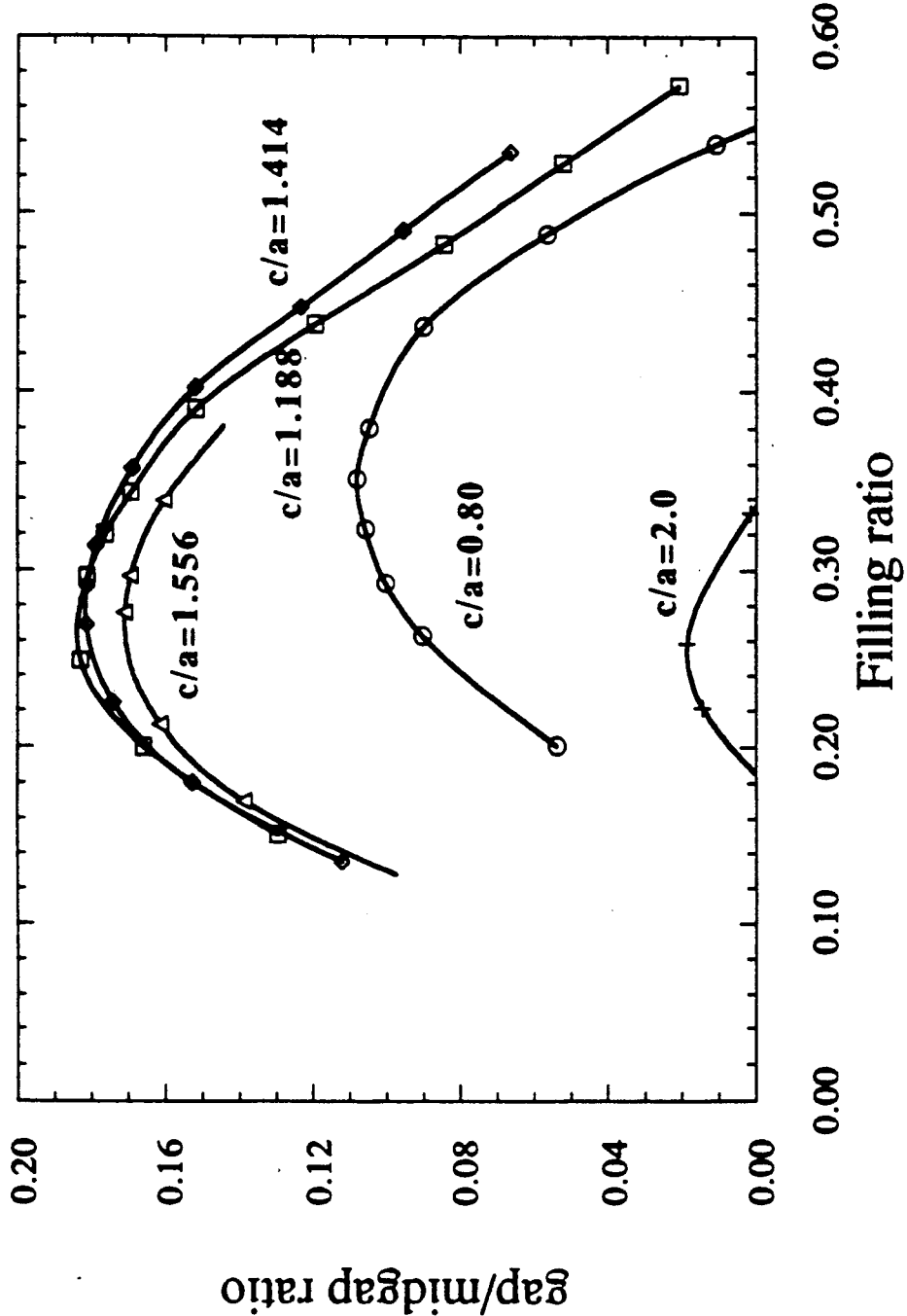
FIG. 10 is a graphical representation showing the dependence of the gap/mid-gap frequency ratio on the filling ratio for touching rectangular rods at various crystal geometries.
Figure 11:
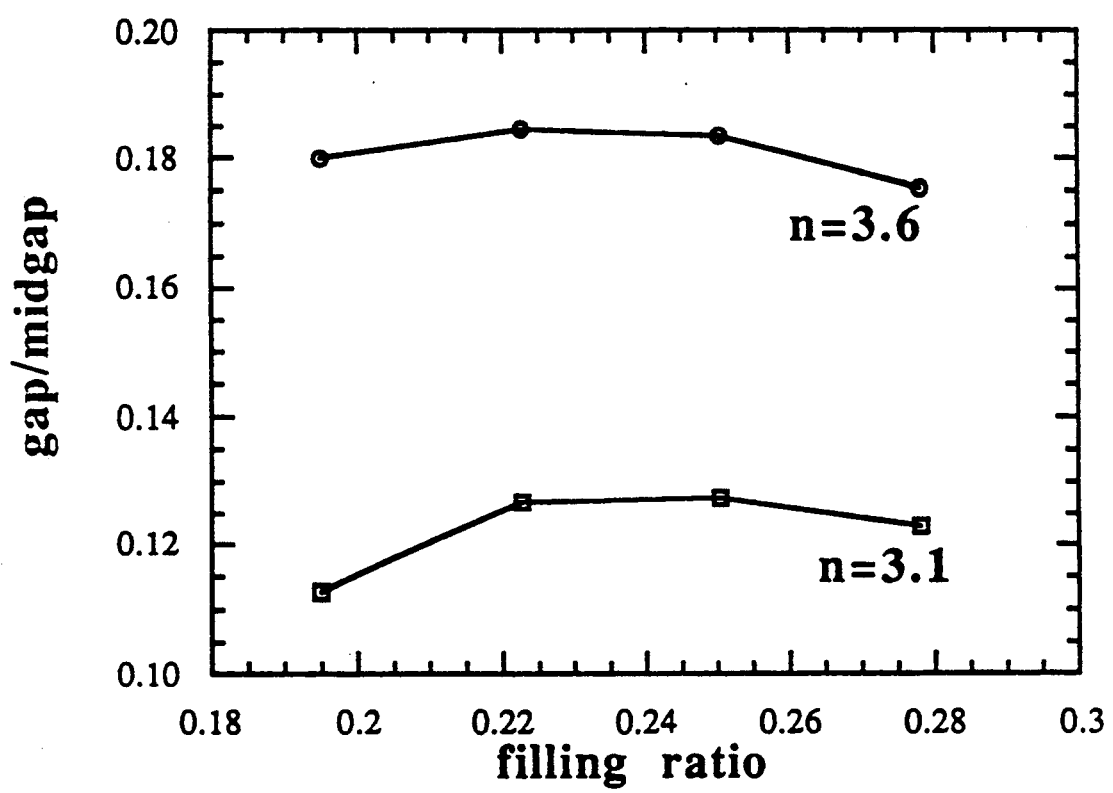
FIG. 11 is a graphical representation showing the dependence of the gap/mid-gap frequency ratio on the filling ratio for touching cylinders of circular cross section in various crystal geometries.

It is also possible to produce structures having a geometry where the rods from adjacent layers touch each other but do not overlap- Such a structure, for example, is illustrated in FIG. 1, where the adjacent layers have only a line of contact but no overlap. FIG. 10 illustrates the results which can be achieved by contacting rectangular cylinders (such as in FIG. 1) as a function of filling ratio for various c/a ratios. The refractive index contrast adopted for the structure of FIG. 10 is 3.6. For the touching geometries, variation of the filling ratio of the structure is accompanied by a corresponding change in aspect ratio of the rectangular cross section in order to maintain contact between cylinders in adjacent layers while still achieving the desired filling ratio. It will be seen that utilizing that geometry gap/mid-gap ratios of about 0.18 are achievable. FIG. 11 illustrates the results for touching cylinders with circular cross section. In this case, changes in the filling ratio is accomplished by changing the c/a ratio (in order to maintain the circular cross section of the rods). The variation of gap/mid-gap ratio with those parameters will be apparent from an examination of FIG. 11.

Figure 12:
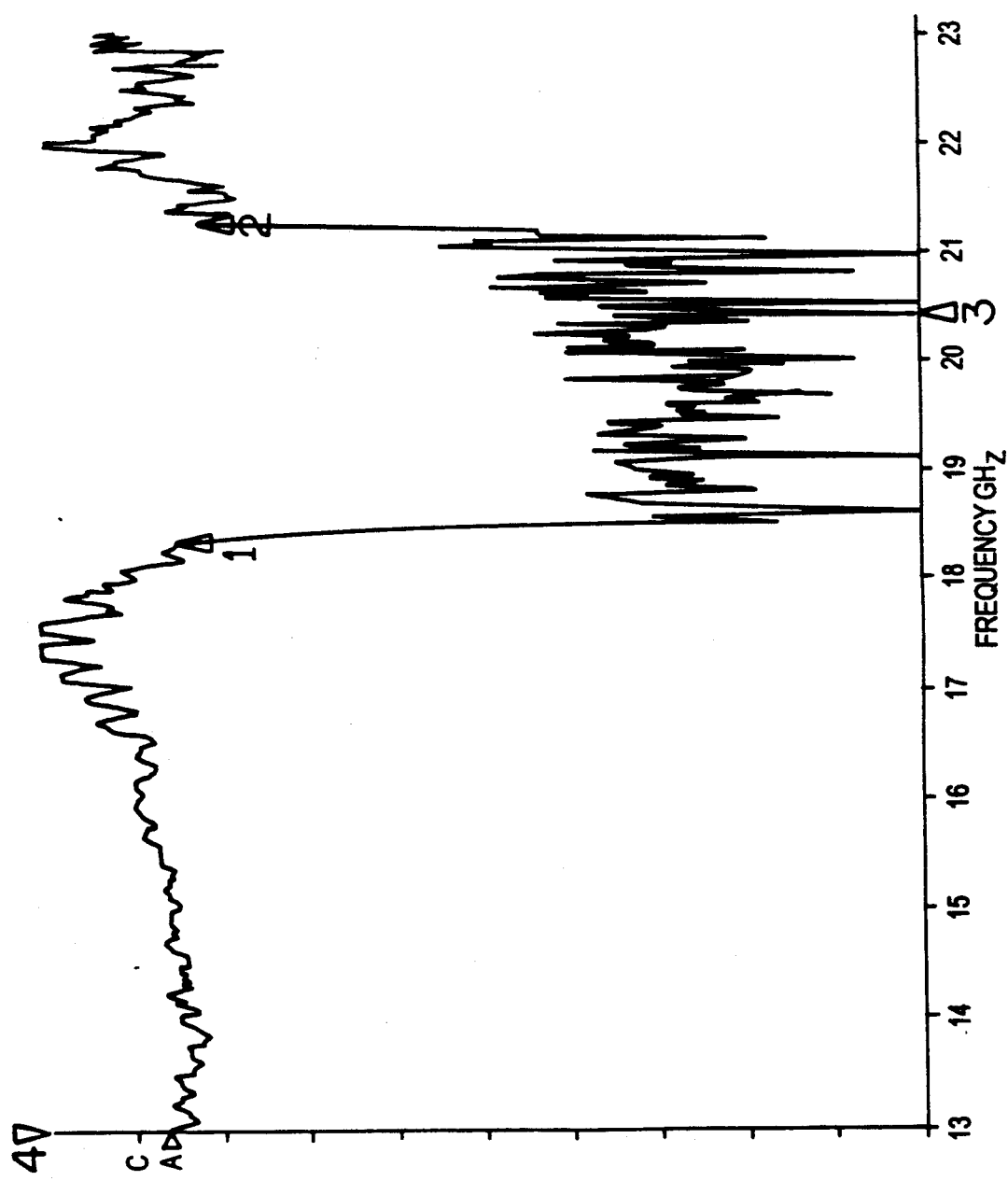
FIGS. 12-14 show experimental results from a microwave model of a periodic dielectric structure of the type shown in FIG. 2, and demonstrating the presence of the photonic band gap in all directions.
Figure 13:
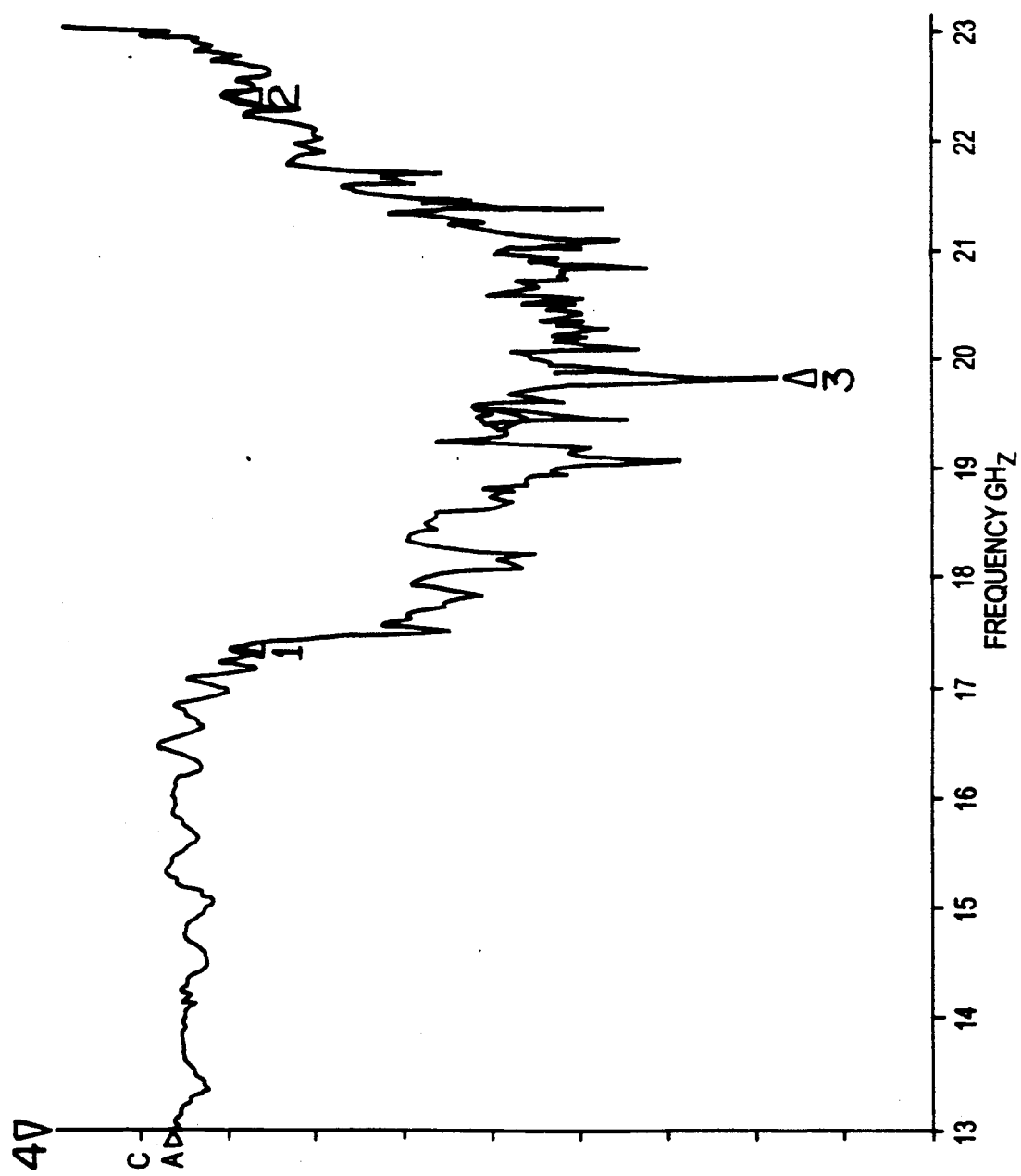
Figure 14:
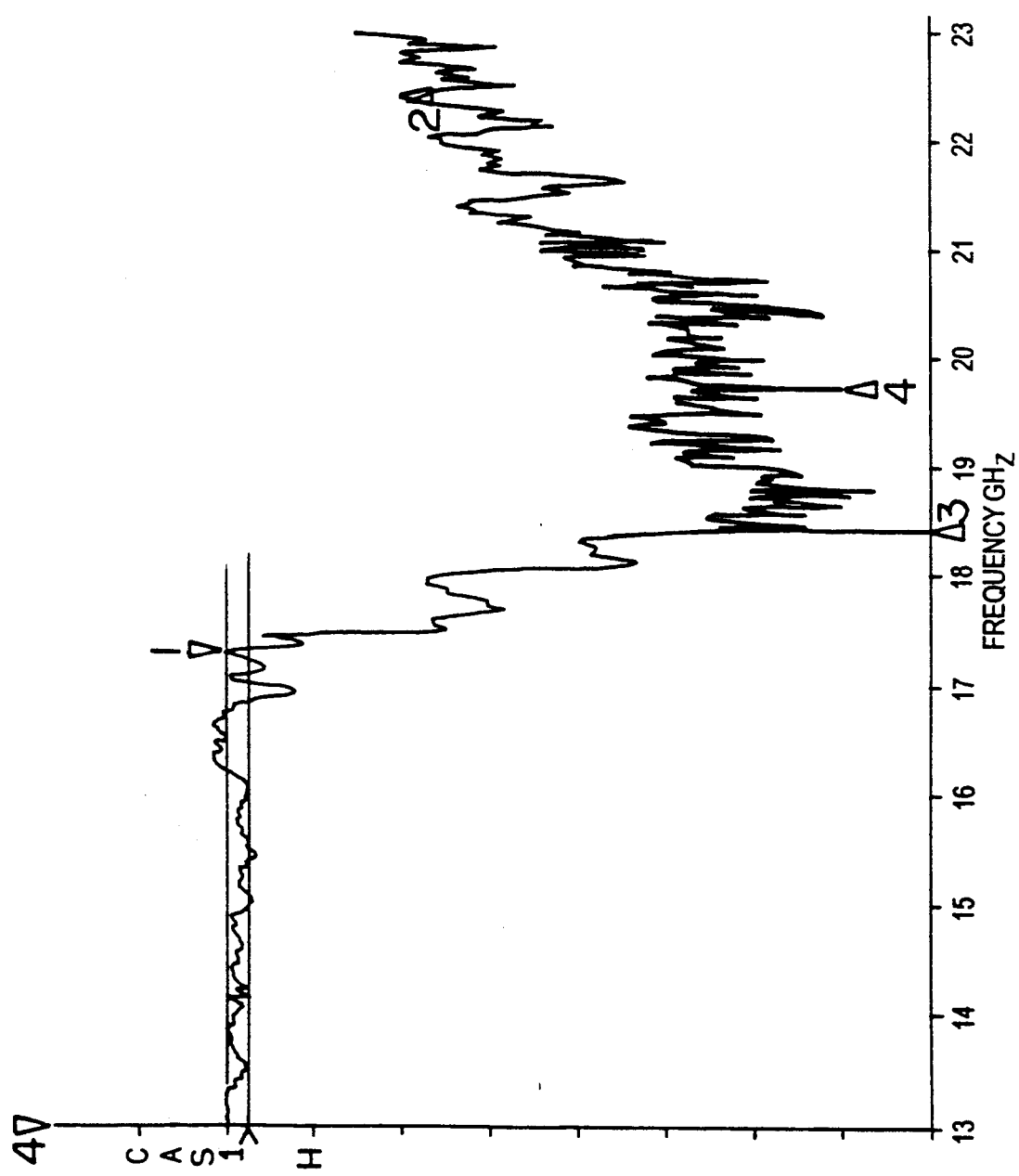

In order to physically demonstrate the results achievable with periodic structures according to the invention, a microwave-size model was constructed and tested. A microwave-size model is one which is scaled up in size from a photonic model, and which will operate at microwave frequencies, in the same way that a photonic model will operate at visible lightwave frequencies. The model was constructed based on the structure of FIG. 2, that is, the use of circular rods arranged in layers with the layers having their rods in contact. The model contained layers of parallel cylindrical alumina rods which were 0.08" in diameter. The center-to-center spacing between rods was 0.28". The model was built of 40 layers, one layer touching the next. There were ten rods per layer arranged on the 0.28" centers. Measurements for the transmission of microwaves through the model in the frequency range of 12 to 24 GHz. demonstrated the presence of a gap in the electromagnetic wave propagation in the "crystal" along the x and z directions for both polarizations. This is illustrated in FIGS. 12–14 which represent the experimental data from the model operated at 12 to 24 GHz. FIG. 12 shows propagation along the x axis and polarization along the z axis. FIG. 13 shows propagation along the x axis and polarization along the y axis (parallel to the rods). It will be seen that a forbidden band exists at about 20 GHz., which is very near the predicted gap center. The arrows at the top of the graph are the predicted gap frequencies which were determined from the calculations set out earlier in this specification. FIG. 14 demonstrates that there is no polarization effect for propagation along the z axis.

| Diameter Of Rods | Spacing Of Rods | Midgap Frequency | Corresponding Wavelength At Midgap |
| --- | --- | --- | --- |
| 0.2 cm | 0.711 cm | 20 GHz. | 15 mm |
| 0.08 cm | 0.284 cm | 50 GHz. | 6 mm |
| 1.33 micron | 4.74 micron | 30 THz. | 10 micron |
| 0.2 micron | 0.711 micron | $2 \times 10^{14}$ Hz. | 1.5 micron |
| 667 Å | 2370 Å | $6 \times 10^{14}$ Hz. | 5,000 Å |

It is apparent that what has been provided is a dielectric structure which on the one hand is capable of achieving a photonic band gap, and on the other hand is capable of practical production. The microwave model was easily fabricated, and the model was tested at microwave size because of the ability to use structures which are easily assembled by hand. Using microelectronic fabrication techniques, it will be readily apparent that one could also produce this structure at a much smaller scale. The important factor is that the device is constructed in single layers, and one layer is laid over the other, for a device which is self-supporting and easily constructable. The substantial advantage this construction achieves over the use of dielectric spheres or the drilling specially oriented holes in dielectrics of the prior art will now be apparent.

Thus, the invention provides a readily fabricatable structure exhibiting a photonic band gap. Individual rods form a given layer with their axes parallel to one another and at a given spacing. A second layer can be laid up in the same fashion, but with the axes perpendicular to the rods of the first layer. The third layer has its axes parallel to the first, but has the rods in the mid-gap in the first layer. The fourth layer has its axes parallel to the second, but with the rods mid-gap of the second. Thus, a four-layer periodic structure is repeated until a three-dimensional structure of desired dimension is achieved. The practical advantage of the invention makes it possible to readily achieve the photonic band gap structure.

What is claimed is:

1. A periodic dielectric structure which exhibits a photonic band gap comprising, in combination:

a plurality of dielectric rods arranged in a matrix of a material having a different and contrasting refractive index, a number of said rods being arranged to form a planar layer, and a plurality of layers being stacked one on the other to form a three-dimensional structure, each layer having a plurality of rods arranged with parallel axes at a given spacing, each layer having its axes oriented at 90° with respect to its adjacent layers, alternate layers having their axes parallel to each other with the rods of one layer in offset between the rods of the other, thereby to form a three-dimensional structure of stacked layers having a four-layer periodicity, the dimensions of the rods, the spacing between the rods, and the refractive contrast of the materials being selected to produce a photonic band gap at a given wavelength.

2. The combination as set forth in claim 1 wherein the alternate layers are arranged with the rods of one layer offset at about the midpoint between the rods of the other layer.

3. The combination as set forth in claim 2 wherein the material of the matrix is of low refractive index and the rods are of a higher refractive index material.

4. The combination as set forth in claim 3 wherein the material of the matrix is air.

5. The combination as set forth in claim 2 wherein the material of the rods is of low refractive index and the matrix is of a higher refractive index material.

6. The combination as set forth in claim 5 wherein the material of the rods is air.

7. The combination set forth in claim 2 wherein the dielectric materials provide a refractive index contrast of two or more.

8. The combination as set forth in claim 2 wherein the layers are stacked one on the other such that the rods of successive layers are in contact.

9. The combination as set forth in claim 2 wherein the layers are stacked such that the rods of successive layers overlap.

10. The combination as set forth in claim 2 wherein the material of the matrix is a dielectric material and the rods are elongate holes formed in the dielectric material.

11. The combination as set forth in claim 2 wherein the rods have a rectangular cross section.

12. The combination as set forth in claim 2 wherein the rods have a circular cross section and thereby comprise a plurality of elongate cylinders.

13. The combination as set forth in claim 2 wherein the rods have an elliptical cross section, the ellipse having a major and a minor axis, and one of said axes being in the plane of the layer which it occupies.

14. A periodic dielectric structure which exhibits a photonic band gap comprising, in combination:

a plurality of elongate rods of a material of a given dielectric constant, the rods being arranged in planar layers with a given spacing between the rods in each layer, the spacing between the rods comprising a material of a different and contrasting refractive index to the material of the rods, the layers being stacked one on the other to form a three dimensional structure having a four-layer periodicity, a first layer comprising equally spaced parallel rods with the axis of all of the rods being in a given axial direction, the second layer comprising equally spaced parallel rods with the axes of the rods being perpendicular to the given axial direction of the first layer, a third layer comprising equally spaced parallel rods with the axes of the rods being parallel to the given axial direction of the first layer, the rods in the third layer being offset to about the midpoint between the rods in the first layer, a fourth layer comprising equally spaced parallel rods with the axes of the rods being perpendicular to the given axial direction of the first layer the rods of the fourth layer being offset to about the midpoint between the rods in the second layer, the dimension of the rods, the spacing therebetween, the refractive index contrast and the filling ratio being related to each other to produce a photonic band gap at a predetermined frequency.

* * * * *

UNITED STATES PATENT AND TRADEMARK OFFICE
CERTIFICATE OF CORRECTION

PATENT NO. : 5,335,240

DATED : August 2, 1994

INVENTOR(S) : KAI-MING HO, CHE-TING CHAN AND COSTAS SOUKOULIS

It is certified that error appears in the above-identified patent and that said Letters Patent is hereby corrected as shown below:

IN THE SPECIFICATION:

Column 1, line 5, after the title and before the "FIELD OF THE INVENTION", insert the following:

-- GRANT REFERENCE

This invention was made with Government support under Contract No. W-7405-EN6-82 awarded by the U.S. Department of Energy. The Government has certain rights in the invention. --.

Signed and Sealed this

Twenty-second Day of November, 1994

Attest:

BRUCE LEHMAN

Attesting Officer

*Commissioner of Patents and Trademarks*